Aug. 18, 1931.  W. Z. BUERGER  1,819,072
STORAGE BATTERY TESTER
Filed Sept. 20. 1928   2 Sheets-Sheet 1

Inventor

Walter Z. Buerger

By Clarence A. O'Brien
Attorney

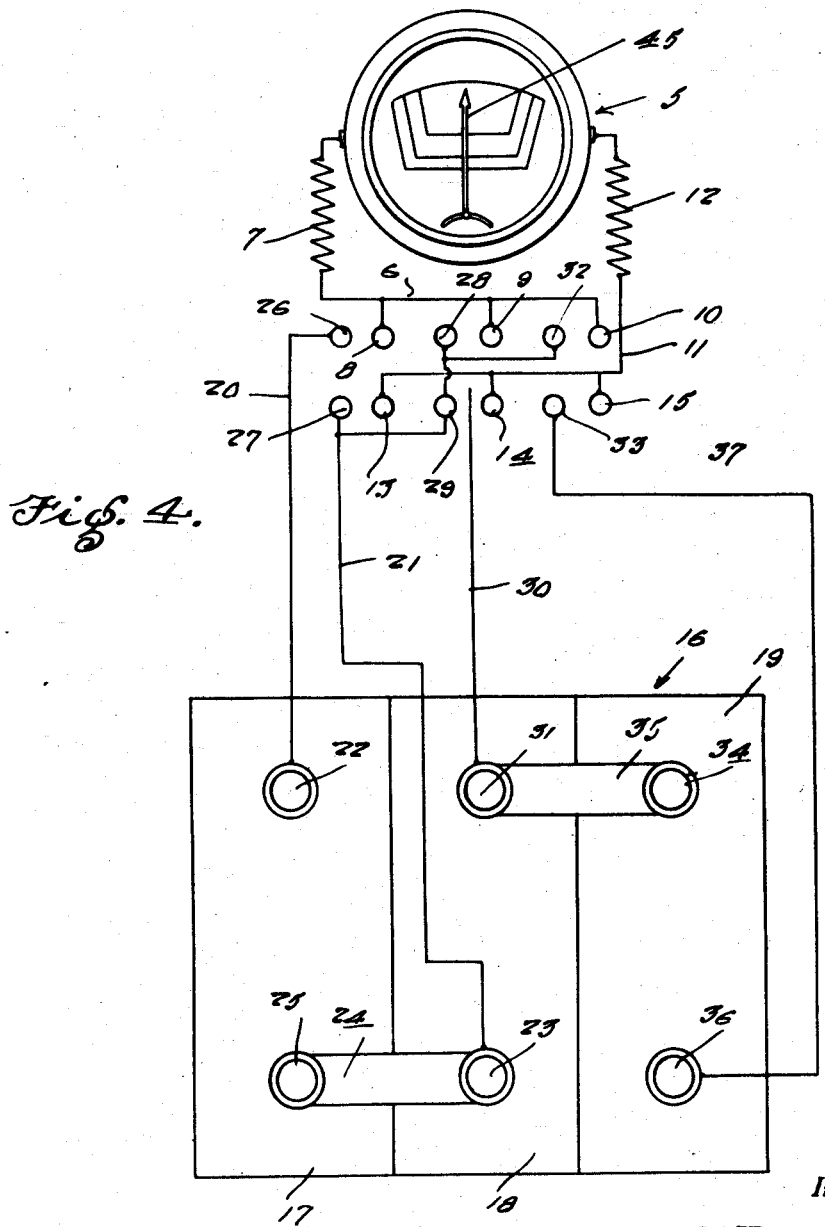

Patented Aug. 18, 1931

1,819,072

UNITED STATES PATENT OFFICE

WALTER Z. BUERGER, OF CHICAGO, ILLINOIS

STORAGE BATTERY TESTER

Application filed September 20, 1928. Serial No. 307,200.

This invention relates to an improved device which is adapted to be mounted upon the instrument board or other convenient place in an automobile, truck, aeroplane or other motor vehicle, the same being constructed to facilitate testing battery cells of the storage battery and spark plugs.

My principal aim is to provide a simple and inexpensive instrument embodying an ammeter or other electrical indicator disposed in plain view of the operator, for indicating the true condition of the battery cells, and spark plugs.

My principal aim, however, is to provide a positive and dependable testing instrument of this class, which will permit the operator to determine the condition of each cell of the battery in a manner to obviate the trouble and expense and loss of time in having a battery and cells examined and tested in a public automobile garage or other similar establishment.

A further object of the invention is to provide an indicator of this type which is simple and plain to the average driver, whereby he may positively determine the condition of various cells of the battery in order that the defect may be quickly repaired before it becomes ruinous in nature.

Another object is to provide an invention of this class which is exceptionally efficient in performance, economical, practical, compact and convenient and such in construction as to fulfill the requirements for a device of this class, in a dependable manner.

Other objects and advantages will become more readily apparent from the following description and drawings.

In the drawings:

Figure 4 is a view showing the wiring diagram.

Figure 1:
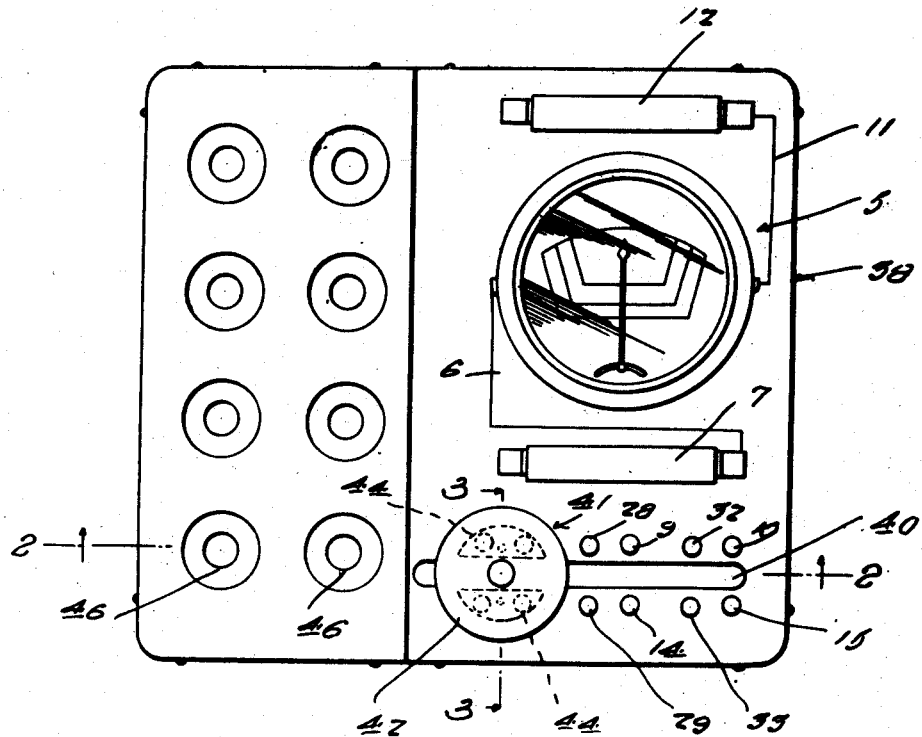
Figure 1 is a plan view of the indicator or testing instrument.

In order that a comprehensive understanding of the arrangement may be promptly obtained, attention is first invited to the wiring diagram seen in Figure 4, wherein 5 designates an ordinary electrical ammeter. A circuit wire 6 is connected through the medium of a resistance element 7 to one side of the ammeter and embodies a series of three contacts 8, 9 and 10. A complemental circuit wire 11 is connected to the opposite side of the ammeter through a resistance element 12 and it embodies individual longitudinally spaced contacts 13, 14 and 15, disposed opposite to contacts 8, 9 and 10.

The reference character 16 designates a conventional storage battery including separate cells 17, 18 and 19 respectively. A separate electric circuit is provided for each cell. The wires of the first circuit are indicated by the numerals 20 and 21, the wire 20 being connected with the cell 17 as at 22, and the wire 21 being connected with the same cell through the medium of the connection 23, the bar 24, and connection 25. A contact 26 is connected with the wire 20 and a complemental contact with the wire 21, these being arranged for cooperation with the first named contacts 8 and 13. Thus we have a group of four contacts for testing the cell 17. The next group of contacts for the cell 18, includes the contacts 9 and 14 and additional contacts 28 and 29. The contact 29 is wired through the binding post connection 23 in the cell 18 and contact 28 is connected through the medium of a wire 30 with the complemental binding post 31 in the same cell.

A still further pair of contact elements 32 and 33 are provided for cooperation with the contacts 10 and 15. The contact 32 is wired to the binding post 34 in the cell 19, by way of the bar 35, while the contact 33 is connected with the remaining binding posts 36, through the medium of another wire 37. Thus, I provide upper and lower rows of contacts arranged in groups of four and adapted to be bridged by a manually operable circuit closer for individual testing of the battery cells through the medium of the ammeter 5, and the circuit connections as claimed.

Figure 2:
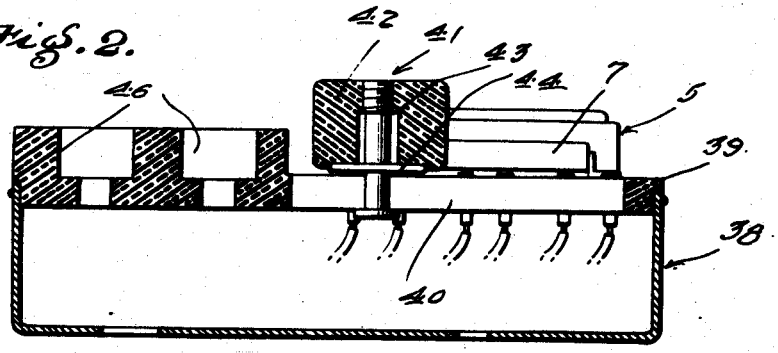
Figure 2 is a section taken approximately upon the plane of the line 2—2 of Figure 1.
Figure 3:
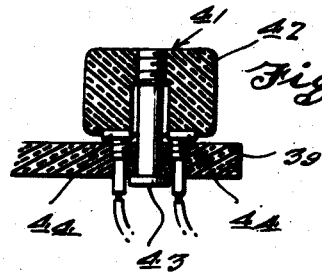
Figure 3 is also a section taken on the line 3—3 of Figure 1.

In carrying out the invention, I propose to provide the type of instruments seen in Figures 1, 2 and 3. This comprises a suitably shaped box 38, having a cover plate 39, of insulation material. The aforesaid contact elements are mounted on this cover plate on opposite sides of the longitudinal slot 40. The circuit closer 41 is movable in this slot. It embodies an insulation knob 42, mounted on a bolt 43, and the shank of the bolt passes through the slot and the head bridges the slot to provide a suitable sliding connection. Segmental contact plates 44 are carried by the bolts and are arranged as shown in dotted lines in Figure 1 to bridge the pairs of contacts included in the separate cell and ammeter circuits. For instance, one plate may bridge the contacts 26 and 8 of the first group and the remaining plate bridges the contacts 27 and 13 of the same group, thus electrically connecting the first cell with both sides of the ammeter to act on the indicating pointer 45 in the ammeter. Thus there is a separate group of four contacts for each cell of the battery, each group being divided into pairs of contacts separately connected with opposite sides of the ammeter.

It is to be noted that there is an upstanding socketed portion formed on the box closing plate 39, the sockets being designated by the numerals 46, and being constructed to accommodate spark plugs. Suitable spark plug testing means may be embodied in this instrument so that it may serve both as a battery and plug tester, the spark plug means being a separate and independent invention, however, and is neither disclosed or specifically described.

It is plainly evident from the description and drawings that the slidable circuit closer 41 is slid back and forth in the slot 40 to selectively close the desired group of contacts to permit the condition of each cell of the battery 16 to be individually determined. It is further through that persons familiar with inventions of this class will be able to obtain a clear understanding of the construction and advantages, after reading the description in connection with the drawings. Consequently a more lengthy description is regarded unnecessary.

Minor changes in the shape, size and rearrangement of parts coming within the field of invention claimed may be resorted to, if desired.

I claim:

In a multiple cell battery testing device of the character described, a switch comprising a plate of electricity insulating material having an elongated slot therein, spaced pairs of contacts arranged on opposite sides of the slot longitudinally therewith, a bolt operable in the slot and extending upwardly therefrom, a knob of electricity insulating material mounted on the bolt for travel over the contacts, and a pair of parallel contact plates mounted on the knob on opposite sides of the bolt, for selective engagement with the pairs of contacts on opposite sides of the slot.

In testimony whereof I affix my signature.

WALTER Z. BUERGER.